US009025585B2

United States Patent
Hong et al.

(10) Patent No.: US 9,025,585 B2
(45) Date of Patent: May 5, 2015

(54) APPARATUS AND METHOD FOR ALLOCATING TIME SLOTS TO NODES WITHOUT CONTENTION IN WIRELESS NETWORK

(75) Inventors: Seung Ho Hong, Gyeonggi-do (KR); Yue Min Ding, Gyeonggi-do (KR)

(73) Assignee: Nestfield Co., Ltd., Gyeonggi-Do (KR)

( * ) Notice: Subject to any disclaimer, the term of this patent is extended or adjusted under 35 U.S.C. 154(b) by 318 days.

(21) Appl. No.: 13/315,901

(22) Filed: Dec. 9, 2011

(65) Prior Publication Data
US 2012/0320881 A1 Dec. 20, 2012

(30) Foreign Application Priority Data

Jun. 20, 2011 (KR) ........................ 10-2011-0059502

(51) Int. Cl.
| | | |
|---|---|---|
| H04B 7/212 | (2006.01) | |
| H04B 7/26 | (2006.01) | |
| H04W 72/04 | (2009.01) | |
| H04W 52/02 | (2009.01) | |
| H04W 72/12 | (2009.01) | |
| H04W 74/02 | (2009.01) | |

(52) U.S. Cl.
CPC ............ *H04B 7/2646* (2013.01); *H04B 7/2659* (2013.01); *H04W 72/0446* (2013.01); *H04W 72/12* (2013.01); *H04W 74/02* (2013.01); *H04W 52/0216* (2013.01); *H04W 52/0219* (2013.01)

(58) Field of Classification Search
USPC .................................................. 370/329, 347
See application file for complete search history.

(56) References Cited

U.S. PATENT DOCUMENTS

| | | | | |
|---|---|---|---|---|
| 2007/0174465 | A1* | 7/2007 | Huang et al. .................. | 709/227 |
| 2010/0124238 | A1* | 5/2010 | Hong et al. .................... | 370/474 |
| 2010/0202349 | A1* | 8/2010 | Guan ............................. | 370/328 |
| 2011/0158206 | A1* | 6/2011 | Shrestha et al. .............. | 370/336 |

OTHER PUBLICATIONS

Yoo, Seong-eun et al., "Scheduling Support for Guaranteed Time Services in IEEE 802.15.4 Low Rate WPAN", Aug. 2005, Proceedings of the 11th IEEE International Conference on Embedded and Real-Time Compuer Systems and Applications.*
Huang, Yu-Kai et al., "An Adaptive GTS Allocation Scheme for IEEE 802.15.4", May 2008, IEEE Transactions on Parallel and Distributed Systems, vol. 19, No. 5, pp. 641-651.*
Na, Chewoo et al., "An Optimal GTS Scheduling Algorithm for Time-Sensitive Transactions in IEEE 802.15.4 Networks", Jun. 2008.*
Hong, Seung-Ho, et al.; "A Bandwidth Allocation Scheme in Fieldbuses"; *International Journal of Control, Automation, and Systems*; (2010) 8(4):831-840.

* cited by examiner

*Primary Examiner* — Jason Mattis
(74) *Attorney, Agent, or Firm* — Alston & Bird LLP

(57) ABSTRACT

Provided is an apparatus and method for allocating time slots to nodes without contention in a wireless network. The method for allotting time slots includes: receiving a packet length and maximum allowable latencies of the nodes and converting them into data in symbol units; determining a beacon order so that a beacon interval representing a length of a superframe is smaller than or equal to a minimum value of the converted maximum allowable latencies; determining a superframe order so that the sum of a length of a beacon frame, a length of a contention access period, and a length of contention free period is smaller than a length of an active portion, based on the converted packet length; and allocating a guaranteed time slot without contention to each node according to an allocation priority order for the nodes.

7 Claims, 12 Drawing Sheets

--Prior Art--

FIG. 2

| Notations | Description |
|---|---|
| $N$ | The number of periodic data generation nodes |
| $i$ | $i \in [1, N]$ |
| $j$ | $j \in [1, 2^{CO_{Max}}]$ |
| $AP_i$ | Allocation priority of node $i$, whose value is integers from 1 to $N$ |
| $M_i$ | MAC upper layer length of node $i$ (bytes) |
| $Ms_i$ | MAC upper layer length node $i$ (symbols) |
| $\phi_i$ | Maximum allowable delay of node $i$ (seconds) |
| $\phi s_i$ | Maximum allowable delay of Node $i$ (symbols) |
| $Bts$ | The number of symbols need to describe one byte of data during transmission |
| $R_s$ | Symbol rate of the media (symbols/second) |
| $\sigma_i$ | The sum of header (PHY and MAC), inter frame space, ACK and turn round time of transceiver (symbols) for the message generated by node $i$ |
| $L_i$ | Message length of node $i$ (symbols) |
| $Ls_i$ | GTS length of node $i$ (slots) |
| $Ls_{Max}$ | The maximum of $Ls_i$ in message set (slots) |
| $FinalCAPslot_j$ | Final CAP slot for the $j$-th superframe ($S_j$) |
| $PBI_i$ | GTS allocation period for node $i$ (symbols) |
| $PBI_{Max}$ | The maximum of $PBI_i$ |
| $CO_i$ | CFP order for node $i$ |
| $CO_{Max}$ | The maximum of $CO_i$, $i=1$ to $N$ |
| $S_j$ | The $j$-th superframe |
| $ExpGTS$ | Expected number of GTSs per superframe |
| $ExpCFPsym$ | Expected number of symbols per superframe needed for the message |
| $Expslot$ | Expected number of slots needed by CFP per superframe |
| $MinCFPlength$ | The minimal length of CFP to schedule $\Phi$ (slots) |
| $MaxCFPlength$ | The maximum allowable length of CFP (slots) |
| $remainedslot_j$ | the number of CFP slots that are still not be scheduled in $S_j$ |
| $remainedGTS_j$ | the number of GTSs that are still not scheduled in $S_j$ |
| $StartSF_i$ | The superframe in which the first GTS for node $i$ is allocated |
| $StartSlot_i$ | The slot from which the GTS for node $i$ starts |
| $Pslot$ | The number of slots contained in CFP in each superframe |
| $PGTS$ | The maximum number of GTSs allowed in each superframe |
| $aSlotDuration$ | The length of one slot (symbols) |
| $BCNsym$ | The length of beacon frame (symbols) |
| $MinCAP$ | Minimal length of CAP defined by IEEE 802.15.4, whose value is 440 symbols |
| $NBTCFP$ | Total Number of bits transmitted during CFP |
| $NBTBCCFP$ | Total Number of bits that can be transmitted during CFP |

FIG. 7

| Input: Message set ($\Phi$) |
|---|
| 1: Step 1: // Initialization |
| 2:      $Ms_i, \phi s_i, L_i \leftarrow$ (5), (6), (7); |
| 3: Step 2: // *BO* determination |
| 4:      $BO \leftarrow$ (8); |
| 5:      $PBI_i, ExpGTS \leftarrow$ (9), (10); |
| 6:      if $ExpGTS > 7$ then |
| 7:          $BO \leftarrow BO - 1$; |
| 8:          if $BO < 0$ then |
| 9:              Adjust message set $\Phi$; |
| 10:         else |
| 11:              go to line 5; |
| 12:         end if |
| 13:      end if |
| 14: Step 3: // *SO* determination |
| 15:      $ExpCFPsym, SO \leftarrow$ (11), (13); |
| 16:      $Ls_i, MinCFPlength, MaxCFPlength \leftarrow$ (14), (16), (17); |
| 17:      if $MinCFPlength > MaxCFPlength$ then |
| 18:          $SO \leftarrow SO + 1$; |
| 19:          if $SO > BO$ then |
| 20:              Adjust message set $\Phi$; |
| 21:         else |
| 22:              go to line 16; |
| 23:         end if |
| 24:      end if |
| 25: Step 4: // Perform allocation procedure |
| 26:      Determine $\Phi'_j, AP_j$; |
| 27:      $Pslot, PGTS \leftarrow MinCFPlength, 7$; |
| 28:      $remainedslot_j, remainedGTS_j \leftarrow Pslot, PGTS$; |
| 29:      for $AP_j$ from 1 to $N$ do |
| 30:          $A, B \leftarrow$ (23), (24); |
| 31:          if $A \cap B$ is not an empty set then |
| 32:              $StartSF_i, StartSlot_i \leftarrow$ (22), (25); |
| 33:              Allocate GTS with interval $PBI_i$; |
| 34:              Update $remainedslot_j$ and $remainedGTS_j$; |
| 35:          else |
| 36:              $Pslot \leftarrow Pslot + 1$; |
| 37:              if $Pslot > MaxCFPlength$ then |
| 38:                  go to Step5; |
| 39:              else |
| 40:                  go to line 28; |
| 41:              end if |
| 42:          end if |
| 43:      end for |
| 44:      Determine $FinalCAPslot_j$; |
| 45:      Output results; |
| 46: Step 5: // Adjustment |
| 47:      $SO \leftarrow SO + 1$; |
| 48:      if $SO > BO$ then |
| 49:          $BO \leftarrow BO - 1$; |
| 50:          if $BO < 0$ then |
| 51:              Adjust message set $\Phi$; |
| 52:          end if |
| 53:          go to line 5; |
| 54:      else |
| 55:          go to line 16; |
| 56:      end if |
| Output: $BO, SO, FinalCAPslot_j$, GTS information |

APPARATUS AND METHOD FOR ALLOCATING TIME SLOTS TO NODES WITHOUT CONTENTION IN WIRELESS NETWORK

CROSS-REFERENCE TO RELATED APPLICATIONS

This application claims priority under 35 U.S.C. §119 to Korean Patent Application No. 10-2011-0059502, filed on Jun. 20, 2011, in the Korean Intellectual Property Office, the disclosure of which is incorporated herein by reference in its entirety.

TECHNICAL FIELD

The following disclosure relates to an apparatus and method for allocating time slots to nodes in a wireless network, and in particular, to an apparatus and method for scheduling a contention free period (CFP) allocating time slots without contention in a wireless sensor network based in IEEE 802.15.4 of a beacon-enabled mode, and a recording medium on which the method is recorded.

BACKGROUND

A wireless sensor network (WSN) is one of essential techniques in the ubiquitous era and is greatly highlighted along with the rapid development of wireless communication and network theories. The wireless sensor network may be utilized for industrial vehicles, home automation, militaries, agriculture, health care, and other various fields. The design of the wireless sensor network system has a very close relation with a specific application program field. In the case of an industrial application, the wireless sensor network should have features such as real-time transmission, low energy consumption, high security, scalability and tenacity.

As specifications for physical layers and link layers of such a sensor network, IEEE 802.15.4 (Low-Rate Wireless Personal Area Network) is settled, and various application products of ZigBee using the same have been put into the market in various fields. In addition, IEEE 802.15.4 suggests wireless connection where a physical (PHY) layer and a medium access control (MAC) layer are defined.

After IEEE 802.15.4 is open to the public, many researchers have suggested a lot of improvements, which result in the improvement of performance of the corresponding specifications. For example, a performance analysis for the GTS allocation mechanism has been already introduced, and a traffic scheduling method for improving the energy efficiency of a network has been proposed. In addition, the implied GTS allocation mechanism has also been proposed for improving the utilization of GTS bandwidth, and the message scheduling method has been introduced for scalability and improvement of the real-time performance of industrial applications. In addition, the adaptive GTS allocation method has been proposed for improving the delay and fairness. However, despite such endeavors, IEEE 802.15.4 still has drawbacks in traffic scheduling due to inherent limitations of the specification.

SUMMARY

An embodiment of the present invention is directed to solving inconvenience of the limited utilization of a network bandwidth caused by the fact that IEEE 802.15.4 standards are able to allocate 7 guaranteed time slots at most in one superframe, overcoming the resultant limit that the real-time transmission is not ensured when more than 7 guaranteed time slots are requested to one coordinator by end devices, and solving the problem that such an allocation algorithm deteriorates the power consumption efficiency in a network.

In one general aspect, a method for allocating time slots to a plurality of nodes without contention in a predetermined wireless network including the nodes according to an embodiment of the present disclosure includes: receiving a packet length and maximum allowable latencies of the nodes and converting into data in symbol units; determining a beacon order (BO) so that a beacon interval (BI) representing a length of a superframe is smaller than or equal to a minimum value of the converted maximum allowable latencies; determining a superframe order (SO) so that the sum of a length of a beacon frame, a length of a contention access period (CAP), and a length of contention free period (CFP) capable of allocating the time slots to nodes without contention is smaller than a length of an active portion (superframe duration: SD), based on the converted packet length; and allocating a guaranteed time slot (GTS) without contention to each node according to an allocation priority order for the nodes.

In addition, the method for allocating time slots to the nodes without contention may further include adjusting at least one of the beacon order and the number of nodes by increasing the determined superframe order until the time slots are allocated to all nodes included in the network and comparing the determined beacon order with the increased superframe order.

In another aspect, a method for allocating contention free periods to nodes in a wireless network according to IEEE 802.15.4 standards according to another embodiment of the present disclosure includes: receiving a request for allocation of guaranteed time slots from a medium access control (MAC) of a device by a next higher layer; and transmitting a GTS.request command having 4 bytes of GTS characteristics fields from the device to a personal area network (PAN) coordinator as a response to the request, wherein the GTS characteristics field includes 1 byte representing a start superframe, 1 byte representing a GTS allocation interval, and 4 bits representing a start slot.

In addition, the method for allocating contention free periods to nodes may further include transmitting a beacon frame having a GTS descriptor field from the PAN coordinator to the device as a response to the GTS.request command, wherein the GTS descriptor field includes 1 byte representing a start superframe and 1 byte representing a GTS allocation interval.

Further, there is provided a computer-readable recording medium on which program for executing the method for allocating time slots to the nodes is recorded.

In another aspect, an apparatus for allocating time slots to a plurality of nodes without contention in a predetermined wireless network including at least one coordinator and the plurality of nodes according to an embodiment of the present disclosure includes: an input unit for receiving, by the coordinator, a packet length and maximum allowable latencies of the nodes and converting into data in symbol units; and a processing unit for determining, by the coordinator, a beacon order so that a beacon interval representing a length of a superframe is smaller than or equal to a minimum value of the converted maximum allowable latencies, determining a superframe order so that the sum of a length of a beacon frame, a length of a contention access period, and a length of contention free period capable of allocating the time slots to nodes without contention is smaller than a length of an active portion based on the converted packet length, and allocating a guaranteed time slot without contention to each node according to an allocation priority order for the nodes.

In addition, the processing unit of the apparatus for allocating time slots to the nodes without contention additionally performs adjusting at least one of the beacon order and the number of nodes by increasing the determined superframe order until the time slots are allocated to all nodes included in the network and comparing the determined beacon order with the increased superframe order.

In another aspect, an apparatus for allocating contention free periods to nodes in a wireless network according to IEEE 802.15.4 standards according to another embodiment of the present disclosure includes a PAN coordinator for receiving a GTS.request command having 4 bytes of GTS characteristics fields from the node, wherein the GTS characteristics field includes 1 byte representing a start superframe, 1 byte representing a GTS allocation interval, and 4 bits representing a start slot.

In addition, the PAN coordinator of the apparatus for allocating contention free periods to nodes may transmit a beacon frame having a GTS descriptor field to the node as a response to the GTS.request command, wherein the GTS descriptor field includes 1 byte representing a start superframe and 1 byte representing a GTS allocation interval.

Since the present disclosure allocates guaranteed time slots in a superframe by using the window scheduling algorithm, 7 or more periodic nodes may be received simultaneously in one coordinator while ensuring real-time transmission, the allocation of bandwidth in the contention free period may be greatly improved, and the efficiency caused by energy consumption in the network may be improved.

Other features and aspects will be apparent from the following detailed description, the drawings, and the claims.

BRIEF DESCRIPTION OF THE DRAWINGS

The above and other objects, features and advantages of the present invention will become apparent from the following description of certain exemplary embodiments given in conjunction with the accompanying drawings, in which:

FIG. 2 is a diagram showing abbreviations and notations used in the operating process for allocating a contention free period in embodiments of the present disclosure;

FIG. 7 is a scheduling algorithm which implements an overall process of FIG. 3 with pseudo codes according to an embodiment of the present disclosure;

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Prior to describing embodiments of the present disclosure, IEEE 802.15.4 standards defining a physical (PHY) layer and a medium access control (MAC) layer for the environment where the embodiments of the present disclosure are implemented, namely a low-speed wireless personal area network (WPAN), will be briefly introduced, and structural problems which may occur in the environment where the embodiments are implemented will be proposed. This standards support two modes: a beacon-enabled mode and a non-beacon-enabled mode. Among them, the embodiments of the present disclosure proposed below have relation with only the beacon-enabled mode, and so only the beacon-enabled mode will be introduced herein.

Figure 1:
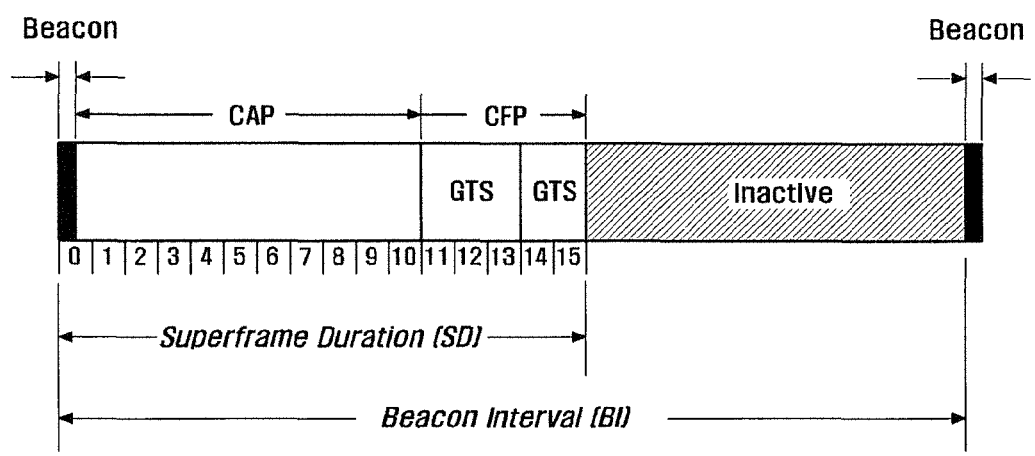
FIG. 1 is a diagram showing a superframe structure which may be used in a beacon-enabled mode according to IEEE 802.15.4 standards.

FIG. 1 is a diagram showing a superframe which maybe used in the beacon-enabled mode according to IEEE 802.15.4 standards. The superframe is classified into an active portion where only one device may transmit or receive data and an inactive portion where all devices sleep. The active portion is divided into 16 slots and includes a beacon transmission period, a contention access period (hereinafter, referred to as CAP) and a contention free period (hereinafter, referred to as CFP). The length of the active portion which is called a superframe duration (hereinafter, referred to as SD) depends on a superframe order (hereinafter, referred to as SO) according to Equation 1 below.

$$SD = aBaseSuperframeDuration \times 2^{SO} \quad \text{Equation 1}$$

Here, the variable "aBaseSuperframeDuration" of Equation 1 is one of constants defined in IEEE 802.15.4 standards and has 960 symbol values. The superframe order (SO) is one of parameters defined in IEEE 802.15.4 standards and has an integer value between 0 and 14. In addition, the length of one slot (aSlotDuration) is calculated using Equation 2 below.

$$aSlotDuration = \frac{SD}{16} \qquad \text{Equation 2}$$

In the beacon transmission period, the coordinator of the network broadcasts a beacon including network information and used by an end device for accessing and synchronizing the network. An interval of two successive beacons is determined by a beacon order (hereinafter, referred to as BO) which is a parameter according to Equation 3 below, and such an interval representing the length of one superframe is called a beacon interval (hereinafter, referred to as BI).

$$BI = aBaseSuperframeDuration \times 2^{BO} \qquad \text{Equation 3}$$

In the beacon-enabled mode, a maximum allowable value of the beacon order (BO) is 14 and a minimum value is 0. In addition, the superframe order (SO) should not be greater than the beacon order (BO).

The contention access period (CAP) is used for transmitting commands and aperiodic data and starts instantly after the beacon transmission is completed. The above standards state that the CAP should maintain a minimum length of 440 symbols in order to ensure exchanges of commands of the network.

The contention free period (CFP) starts at the first slot boundary after the contention access period (CAP) and includes guaranteed time slots (hereinafter, referred to as GTS.). The guaranteed time slot (GTS) is applied by the end device for real-time transmission and is allocated by a network coordinator. Among 16 slots, a slot having a greater sequence is allocated first of all, which means that the slot 15 is allocated first of all in the contention free period (CFP). One guaranteed time slot (GTS) may include a plurality of time slots, and the number of slots is determined by the length of real-time data. A maximum number of guaranteed time slots (GTS) in one superframe is 7.

Meanwhile, like the fact that the MAC layer takes a certain time for processing the data received by the PHY layer, IEEE 802.15.4 standards define an interframe space (hereinafter, referred to as IFS) as a minimal separation of two frames transmitted by the device. The size of the interframe space (IFS) has a relation with the size of a frame just transmitted, and, in a case where the size of the frame is not greater than 18 bytes, a short interframe space (hereinafter, referred to as SIFS) is used. Meanwhile, a long interframe space (hereinafter, referred to as LIFS) is used as a minimum separation. In a case where the frame requires acknowledgement (hereinafter, referred to as ACK), the interframe space (IFS) becomes a minimum separation of next frames which is to be acknowledged and transmitted.

In addition, IEEE 802.15.4 standards define three kinds of essential transmission media of 868 MHZ, 915 MHz and 2450 MHz. The modulation method, the number (Bts) of data symbols each byte of which is mapped during the transmission, and symbols rates ($R_s$) are shown in Table 1 below.

TABLE 1

| Frequency (MHz) | Modulation | Bts | $R_s$ |
|---|---|---|---|
| 868 | BPSK | 8 | 20 |
| 915 | BPSK | 8 | 40 |
| 2450 | O-QPSK | 2 | 62.5 |

The above Bts and $R_s$ will be used for unit conversion in Process 1 of a scheduling algorithm according to embodiments of the present disclosure.

Now, the environments and situations utilized by the embodiments of the present disclosure will be simplified and assumed as follows. A network using a star topology where one PAN coordinator collecting data and a plurality of end devices detecting data are present is assumed. At this time, detection data transmitted during the contention free period (CFP) is periodically generated. Each periodic data should be transmitted before a next periodic data is generated. Therefore, those data have their own maximum allowable data latencies.

IEEE 802.15.4 standards regulate that guaranteed time slots (GTS) not exceeding 7 at most may be allocated in one superframe. In addition, after one guaranteed time slot (GTS) is successfully allocated to a specific device in the network, the guaranteed time slot (GTS) may be maintained in all superframes until a deallocation command is generated by the corresponding device. However, this mechanism is not only ineffective and but also inflexible for periodic data transmission. For example, if a data generation period for one device is longer than two beacon intervals (BI), 50% or more of the guaranteed time slots (GTS) are not useable. In addition, since more than 7 periodic nodes may not be set in one coordinator, a serious limitation is present in the network scalability. This means that, in a case where 7 or more periodic nodes are set in the network, real-time transmission may not be ensured. Therefore, in the embodiments of the present disclosure proposed below, a method for scheduling a contention free period (CFP) will be suggested in order to overborne such a limitation of IEEE 802.15.4.

The embodiments of the present disclosure introduced below focus on industrial applications of a wireless sensor network, and a new traffic scheduling algorithm based on a window scheduling algorithm (WSA) is suggested. Here, the number of nodes generating periodic data in the network is set to be N. FIG. 2 is a diagram showing abbreviations and notations used in the operating process for allocating a contention free period in the embodiments of the present disclosure, and all abbreviations stated below are shown in FIG. 2. However, abbreviations utilized in each detailed operation will be described again.

An input value of the scheduling algorithm according to this embodiment is a set of periodic messages of the network as shown in Equation 4 below. The message set ($\phi$) includes an MAC upper-layer packet ($M_I$) and the length of maximum allowable latency ($\phi_i$) of the node which generates periodic data.

$$\Phi = \{[M_I,\phi_I], \ldots ,[M_N,\phi_N]\} \qquad \text{Equation 4}$$

The output value of the scheduling algorithm determines the guaranteed time slot (GTS) allocated to each periodic data in the contention free period (CFP) of the superframe. Parameters required for allocating the guaranteed time slot (GTS) include FinalCAPslot$_j$, StartSF$_i$, PBI$_j$, StartSlot$_i$, and Ls$_i$ as shown in Table 2 below.

TABLE 2

| Final CAP slot for the j-th superfame | |
|---|---|
| GTS allocation parameters for node i | Start superframe<br>GTS allocation Period<br>Start Slot<br>GTS Length |

In other words, the scheduling algorithm proposed in the embodiments of the present disclosure is intended to operate by using input values as in Equation 4 and calculate output values as in Table 2. At this time, the output values are parameters for determining GTS, which correspond to output values which may overcome the conventional limitations of IEEE 802.15.4 stated above. Hereinafter, the embodiments of the present disclosure will be described in more detail with reference to the drawings.

Figure 3:
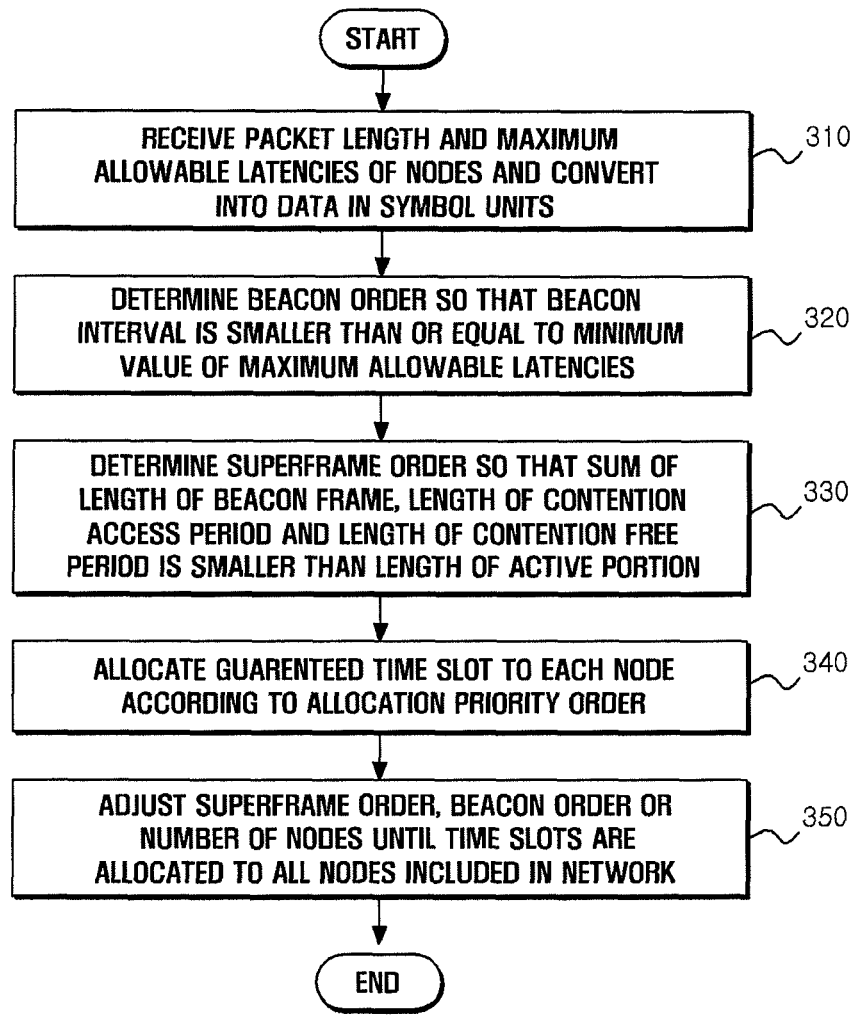
FIG. 3 is a flowchart illustrating a method for allocating time slots to nodes without contention in a predetermined wireless network including a plurality of nodes according to an embodiment of the present disclosure.

FIG. 3 is a flowchart illustrating a method for allocating time slots to nodes without contention in a predetermined wireless network including a plurality of nodes according to an embodiment of the present disclosure. Here, the predetermined wireless network means a wireless network by the beacon-enabled mode according to IEEE 802.15.4 standards, but it may be extensively applied to wireless sensor networks having similar features if the technical means and ideas proposed in the embodiments of the present disclosure are identically maintained.

Process 1: Change of Unit of Input Parameter

In Operation 310, a pack length and maximum allowable latencies of nodes are received and converted into data in symbol units. In more detail, since SD, aSlotDuration and BI in Equations 1 and 3 above are stated in IEEE 802.15.4 in symbol units, in Process 1, the unit of message set φ for the symbol is changed by using Equations 5 to 7. For this purpose, values of Bts and $R_s$ are proposed in Table 1 above. The purpose of Process 1 is to simplify calculations in the following operations.

$$Ms_i = M_i \times Bts \qquad \text{Equation 5}$$

$$\phi s_i = \phi_i \times R_s \qquad \text{Equation 6}$$

In Equation 5, $Ms_i$ represents the length of the MAC upper-layer frame. In addition, through these embodiments, it is necessary to consider the entire time required for transmitting packets. The entire time is calculated by adding MAC layer header, PHY layer header, transceiver turn-around time, ACK (if required), and IFS for $Ms_i$. The length of the message of the node i is corrected according to Equation 7 below.

$$L_i = Ms_i + o_i \qquad \text{Equation 7}$$

Figure 4:
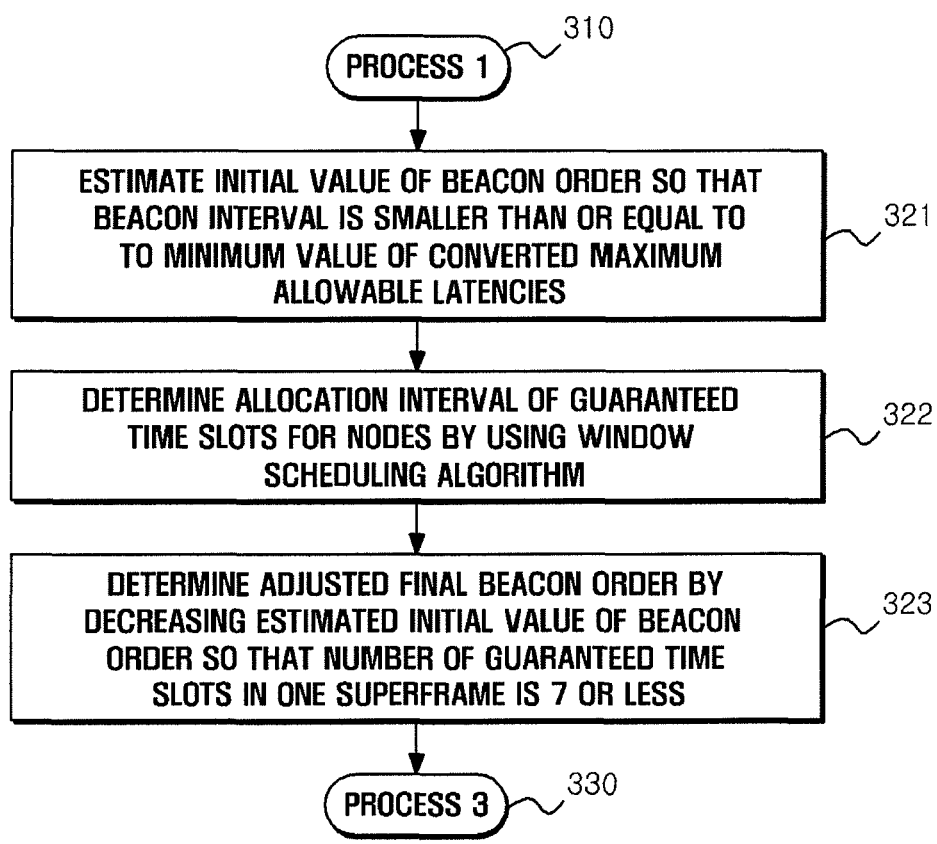
FIG. 4 is a flowchart specifically illustrating a process of determining a beacon order in the method of FIG. 3 according to an embodiment of the present disclosure.

Process 2: Determination of Beacon Interval (BI) of Superframe and GTS Allocation Interval ($PBI_i$) for Node i In Operation 320, the beacon order (BO) is determined so that the beacon interval (BI) representing the length of the superframe becomes smaller than or equal to a maximum value of the maximum allowable latency converted through Operation 310. Hereinafter, the process of determining the beacon order will be described as follows with reference to FIG. 4.

In Operation 321, an initial value of the beacon order is estimated so that the beacon interval becomes smaller than or equal to the maximum allowable latency converted through Operation 310.

In Operation 322, an allocation interval of guaranteed time slots for nodes is determined by using the window scheduling algorithm. The window scheduling algorithm is an algorithm which divides one transmission medium with a limited bandwidth into a plurality of windows which may be shared by a plurality of nodes, and which is scheduled so that a generation time of periodic data in the divided window does not exceed a preset threshold value.

In Operation 323, the initial value of the beacon order estimated through Operation 321 is reduced so that the number of guaranteed time slots in one superframe becomes 7 or less, thereby determining an adjusted final beacon order.

In more detail, in a series of operations above, the initial value of the parameter BO is initially estimated, and its final value is determined through repeating operations. After the BO is determined, the beacon interval (BI) is calculated using Equation 3 above, and the transmission medium is divided into a plurality of superframes by means of the beacon interval. Each superframe includes GTS allocated to the end device for the real-time transmission. In order to satisfy the demand on real-time service, the beacon interval may not exceed the minimum allowable latency ($\phi s_i$) in the message set φ. Since the BI is calculated using Equation 3, Equation 8 below may be obtained.

$$BI = aBaseSuperframeDuration \times 2^{BO} \leq \phi s_{Min} \qquad \text{Equation 8}$$

In Equation 8 above, $\phi s_{Min}$ represents a minimum value of $\phi s_i$.

In addition, in order to satisfy the demand on energy efficiency, the embodiments of the present disclosure want that Bi has as great value as possible. For greater BI, both of the inactive portion and the beacon transmission interval become longer, and therefore the energy consumption in the network is reduced. The standards adopted in this embodiment are set so that BO has an integer value between 0 and 14 for the beacon-enabled mode, and therefore the BO is initially set to be a maximum integer value between 0 and 14 which satisfies Equation 8.

After the BI is initially determined, the node i and $PBI_i$ are calculated by using the window scheduling algorithm (S. H. Hong and J. H. Lee, "A Bandwidth Allocation Scheme in Fieldbuses", International Journal of Control, Automation, and Systems, Vol. 8, No. 4, pp. 831-840, August 2010). The window scheduling algorithm harmonizes $PBI_i$ values of all nodes in the network, and the $PBI_i$ of the node i is determined using Equation 9 below.

$$PBI_i = BI \times 2^{CO_i}, \; CO_i = \left\lfloor \log_2\left(\frac{\phi S_i}{BI}\right) \right\rfloor, \; \forall \, i = 1 \text{ to } N \qquad \text{Equation 9}$$

In order to ensure real-time transmission, the period of GTS of the node i should not exceed its maximum allowable latency. In Equation 9, the CFP order ($CO_i$) for the node i is a new parameter introduced for the scheduling algorithm adopted in the embodiments of the present disclosure. The $PBI_i$ determined by Equation 9 does not exceed $\phi s_i$, and the $PBI_i$ values (i=1 to N) of all nodes are multiples or submultiples of other values. The least common multiple of the $PBI_i$ is $PBI_{Max}$, and $PBI_{Max}$ means that the allocation of GTS for the message group φ repeats all $PBI_{Max}$ symbols. Meanwhile, practical explanation on the window scheduling algorithm in the above operations may defocus the essence of the present disclosure and therefore it is not provided here.

Now, the number of GTS expected in one superframe for the message set φ is determined by Equation 10 below.

$$ExpGTS = \sum_{i=1}^{N} \frac{1}{2^{CO_i}} \qquad \text{Equation 10}$$

Since the standards adopted in the embodiments of the present disclosure set that the number of GTS capable of being allocated in one superframe is 7 at most, if ExpGTS is greater than 7, the message set φ may not be scheduled for the initially determined BI. In the next operation, the BO is initially adjusted so that all messages generated in one superframe are received in slots provided by the superframe. If the BO decreases by 1, the BI will be halved according to Equation 3. In this case, the ExpGTS will decrease according to Equations 9 and 10. The process of reducing the BO by 1 repeats until the ExpGTS becomes equal to or smaller than 7. If the BO reaches 0 and the ExpGTS is still greater than 7, the message set φ is not scheduled. It is because the traffic condition given to the message set φ exceeds the network capacity. In this case, it is necessary to adjust the input (φ) by reducing the number of nodes in the network.

The procedure for determining the beacon interval (BI) of the superframe and the GTS allocation period for the node i may be adjusted in Process 5 below.

Process 3: Determination of Superframe Duration (SD) and GTS Length ($Ls_i$) for Node i Now, FIG. 3 is referred again to describe Process 3.

Figure 5:
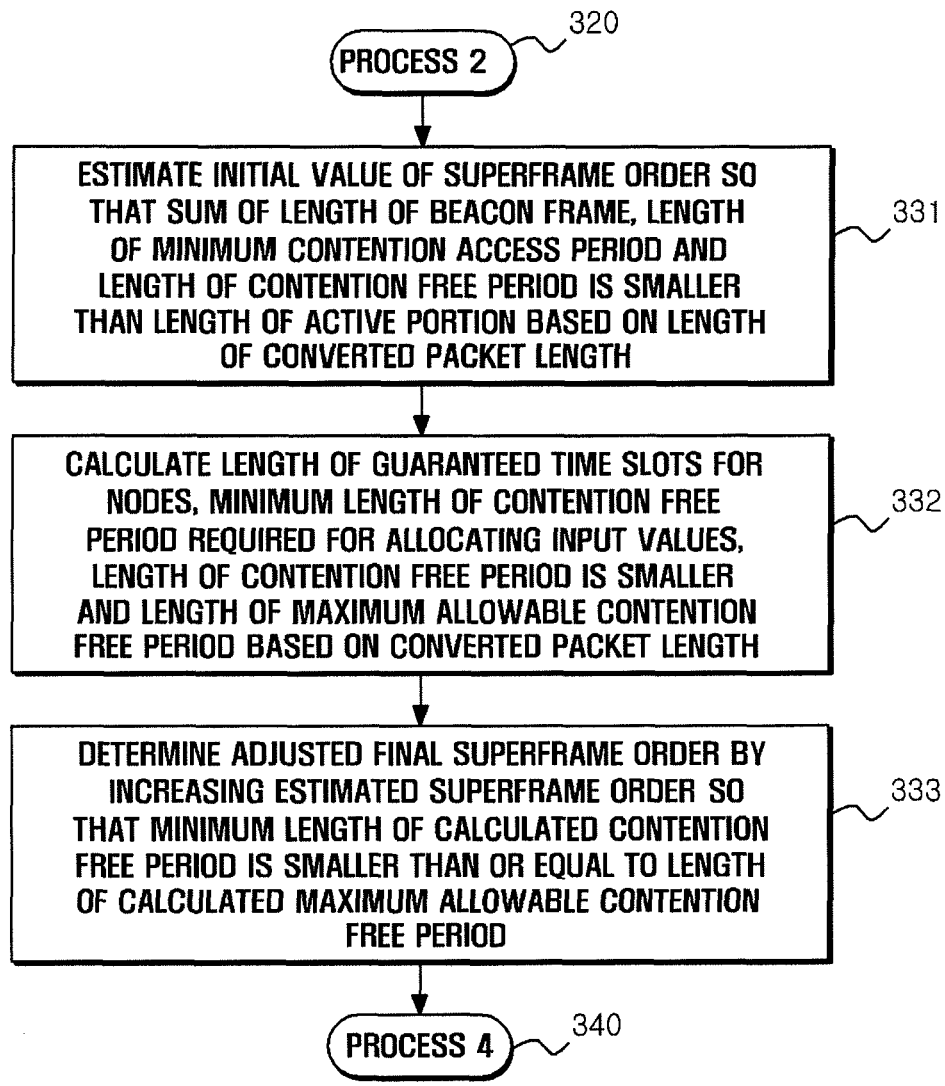
FIG. 5 is a flowchart specifically illustrating a process of determining a superframe order in the method of FIG. 3 according to an embodiment of the present disclosure.

In Operation 330, the superframe order (SO) is determined so that the sum of the length of the beacon frame, the length of the contention access period (CAP), and the length of the contention free period (CFP) capable of allocating time slots to nodes without contention is smaller than the length of the active portion (superframe duration; SD) based on the packet length converted through Operation 310. Hereinafter, the process of determining the superframe order will be described with reference to FIG. 5.

In Operation 331, the initial value of the superframe order is estimated so that the sum of the length of the beacon frame, the length of the minimum contention access period, and the length of the contention free period is smaller than the length of the active portion based on the packet length converted through Operation 310.

In Operation 332, the length of the guaranteed time slots for nodes, the minimum length of the contention free period required for allocating input values, and the length of the maximum allowable contention free period are calculated based on the packet length converted through Operation 310.

In Operation 333, an adjusted final superframe order is determined by increasing the superframe order estimated through Operation 331 so that the minimum length of the contention free period calculated through Operation 332 is smaller than or equal to the length of the maximum allowable contention free period.

The above process will be described in more detail as follows.

In Process 3, the initial value of the parameter SO is estimated initially, and its final value is determined through repeating processes. After $CO_i$ for each node is determined in Process 2, the estimated number of symbols included in CFP per a superframe may be calculated using Equation 11 below.

$$ExpCFPsym = \sum_{i=1}^{N} \frac{L_i}{2^{CO_i}}$$  Equation 11

Since the sum of the length of the beacon frame, the initial CAP length and the CFP length should be smaller than or equal to the length of the active portion (SD), Equation 12 below may be obtained.

BCNsym+aMinCAPlength+
ExpCFPsym≤SD=aBaseSuperframeDuration×
$2^{SO}$  Equation 12

For energy efficiency, SD as short as possible is desired, and therefore SO is initially set to be a minimum integer value which satisfies Equation 12 as shown in Equation 13 below.

$$SO = \left\lceil \log_2\left(\frac{BCNsym + aMinCAPlength + ExpCFPsym}{aBaseSuperframeDuration}\right) \right\rceil$$  Equation 13

In Equation 13, aSlotDuration may be calculated from the SO by using Equation 2 above. In this case, $Ls_i$ (GTS length for the node i) may be calculated through Equation 14 below.

$$Ls_i = \left\lceil \frac{L_i}{aSlotDuration} \right\rceil$$  Equation 14

Now, the estimated number of CFP slots in each superframe is determined by Equation 15 below.

$$Expslot = \sum_{i=1}^{N} \frac{Ls_i}{2^{CO_i}}$$  Equation 15

The number of CFP slots included in each superframe should not be smaller than $Ls_{Max}$ and Expslot. Here, $Ls_{Max}$ represents a maximum value of $Ls_i$. The number of CFP slots should be as small as possible in order to save communication resources. Therefore, MinCFPlength is set to be a minimum integer value not smaller than $Ls_{Max}$ or Expslot as shown in Equation 16 below.

MinCFPlength=⌈max($Ls_{Max}$,Expslot)⌉  Equation 16

Since the standards adopted in the embodiments of the present disclosure are set so that 16 slots are included in the active portion, the maximum allowable number (MaxCFPlength) of slots included in the CFP is calculated using Equation 17 below.

MaxCFPlength=16−BCNCAPlength  Equation 17

Here, BCNCAPlength (the minimum number of slots and CAP used by the beacon) is determined by Equation 18 below.

$$BCNCAPlength = \left\lceil \frac{BCNsym + aMinCAPlength}{aSlotDuration} \right\rceil$$  Equation 18

In addition, MinCFPlength should not be greater than MaxCFPlength as shown in Equation 19 below.

MinCFPlength≤MaxCFPlength  Equation 19

If MinCFPlength determined by Equation 16 does not satisfy Equation 19, the message set φ is unable to be scheduled for SO initially determined in Equation 13. However, if the SO increases by 1, aSlotDuration increases according to Equation 2, $Ls_i$ and BCNCAPlength decreases respectively according to Equation 14 and Equation 18, and Expslot decreases according to Equation 15. This principle results in the decrease of MinCFPlength according to Equation 16 and the increase of MaxCFPlength according to Equations 17 and 18. In addition, it should be noted that the SO is smaller than BO. If the SO reaches BO and Equation 19 is still not satisfied, the message set φ is not scheduled. It is because the given traffic condition of the message set φ exceeds the network capacity. In this case, it is required to adjust the input φ by decreasing the number of nodes in the network.

Meanwhile, the procedure for determining the superframe duration (SD) and the GTS length ($Ls_i$) for the node i may also be adjusted in Process 5 below.

Process 4: Allocation of GTS for Each Node

Now, FIG. 3 is referred again to describe Process 4.

In Operation 340, the guaranteed time slots (GTS) without contention are allocated to nodes, respectively, according to the allocation priority order for nodes. In other words, the operation for allocating the guaranteed time slots determines the allocation priority order for the nodes according to an allocation interval of the guaranteed time slots and the length of the guaranteed time slots, and allocates the guaranteed time slots to nodes, respectively, according to the determined allocation priority order by using the allocation interval of the guaranteed time slots.

In more detail, in Process 4, the algorithm according to the embodiments of the present disclosure allocates suitably CFP slots to nodes, respectively. The input of Process 4 includes MinCFPlength, MaxCFPlength and $\phi'$. A new message set $\phi'$ is defined with $Ls_i$ and $PBI_i$ as in Equation 20 below.

$$\Phi'=\{[Ls_1, PBI_1], \ldots, [Ls_N, PBI_N]\} \quad \text{Equation 20}$$

The purpose of Process 4 above is to allocate slots in each superframe to nodes according to the demand displayed by the message set $\phi'$ in Equation 20. By doing so, (i) the number of CFP slots used in each superframe does not exceeds the number (Pslot) of slots included in CFP, and (ii) the number of GTS does not also exceed 7 which is the maximum allowable number (PGTS) of GTS in one superframe. As stated in Equation 21 below, Pslot should not be smaller than MinCFPlength of Equation 16 and should not be greater than MaxCFPlength of Equation 17. Since the embodiments of the present disclosure desire as small Pslot as possible in order to save communication resources, the value of Pslot is initialized to MinCFPlength which is a minimum allowable value.

$$\text{MinCFPlength} \leq \text{Pslot} \leq \text{MaxCFPlength} \quad \text{Equation 21}$$

Figure 6:
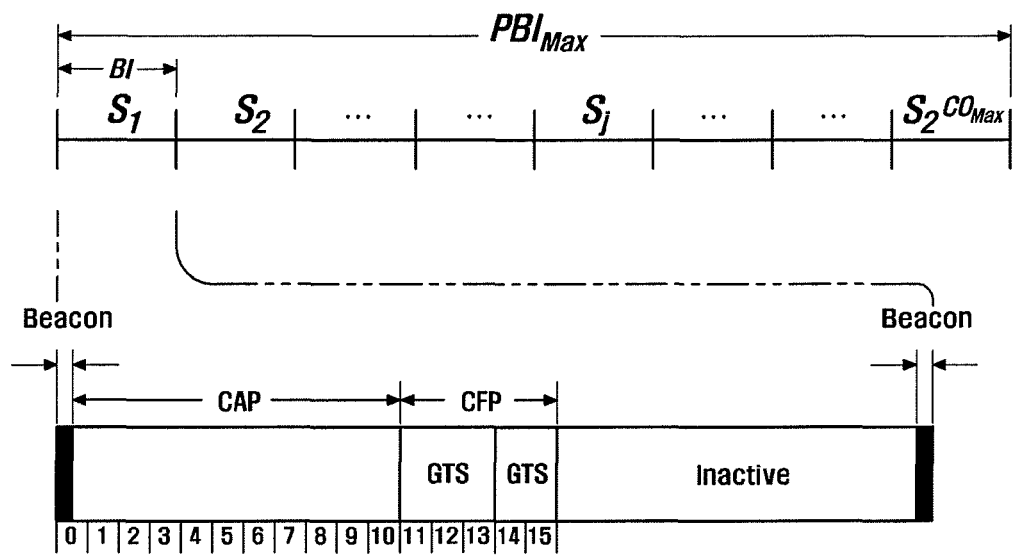
FIG. 6 is a structural diagram illustrating a process of allocating guaranteed time slots in the method of FIG. 3 according to an embodiment of the present disclosure.

As described in Process 2 above, the GTS allocation for the message set $\phi'$ repeats during the interval of $PBI_{Max}$, and therefore the initial $PBI_{Max}$ allocation is focused. To the node i, the GTS for packet transmission is periodically allocated. If the initial GTS is allocated, other GTSes may be determined according to the allocation interval ($PBI_i$). The initial GTS allocated to the node i may be determined by the start superframe ($StartSF_i$) where the initial GTS is allocated to the node i, the start slot ($StartSlot_i$) where the GTS for the node i starts, and the identification of the GTS length ($Ls_i$) for the node i. The GTS allocation is schematically shown in FIG. 6. FIG. 6 is a structural diagram illustrating the process of allocating guaranteed time slots in the method of FIG. 3 according to an embodiment of the present disclosure, where $S_j$ represents a j-th superframe in $PBI_{Max}$.

Before the allocation starts, it is necessary to determine the allocation priority order of each node. The allocation priority order ($AP_i$) is selected as a natural number from 1 to N, where a smaller number means a higher priority order. Each node has various allocation priority orders which are determined according to the GTS allocation interval ($PBI_i$) and the GTS length ($Ls_i$). Nodes having small $PBI_i$ are endowed with high allocation priority orders. For nodes having the same $PBI_i$, a node having a greater GTS length ($Ls_i$) is endowed with a higher priority order. In other words, the process progresses from the node having a highest allocation priority order to nodes having relatively lower allocation priority orders.

In order to determine $StartSF_i$ for each node, it is required to know the number (remainedslot$_j$) of unallocated CFP slots and the number (remainedGTS$_j$) of unallocated GTS in $S_j$. In the initial stage where no GTS is allocated, remainedslt$_j$ is identical to the number (Pslot) of slots in CFP, and remainedGTS$_j$ is identical to 7 which is the maximum allowable GTS number (PGTS) in one superframe. The GTS for the node i may be allocated to only superframes where remainedslot$_j$ is not smaller than the GTS length ($Ls_i$) of the node i and remainedGTS$_j$ is not smaller than 1. In addition, $StartSF_i$ for the node i should be one of initial $2^{CO_1}$ superframes. By doing so, the real-time demand may be ensured as determined by Equation 22.

$$\text{StartSF}_i = S_{min(A \cap B)} \quad \text{Equation 22}$$

Here, A and B are endowed by Equation 23 and Equation 24 below, respectively. In Equations 23 and 24, the parameter k is an integer value between 1 and $2^{CO_i}$.

$$A=\{k: \text{remainedslot}_k \geq Ls_i\}, k \in [1, 2^{CO_i}] \quad \text{Equation 23}$$

$$B=\{k: \text{remainedGTS}_k \geq 1\}, k \in [1, 2^{CO_i}] \quad \text{Equation 24}$$

After $StartSF_i$ is determined, the initial GTS allocated to the node i is determined through Equation 25 below.

$$\text{StartSlot}_i = 16 - \lfloor \text{Pslot} \rfloor - \text{remainedslot}_{min(A \cap B)} \rfloor - Ls_i \quad \text{Equation 25}$$

If the GTS allocation is completed for all nodes, the final CAP slot (FinalCAPslot$_j$) of $S_j$ may be determined as a slot just before the initial CFP slot.

However, if $A \cap B$ in Equation 22 is an empty set, $StartSF_i$ may not be found for the node i. In this case, the value of Pslot increases by 1, and the allocation of the message set starts again. However, if the value of Pslot reaches MaxCFPlength and the demand for the message set $\phi'$ is not yet satisfied, the algorithm according to this embodiment will proceed to Process 5 in order to correct the BO and SO values.

Process 5: Correction of BO and SO Values or Traffic Condition in Message Set $\phi'$ Based on Allocation State in Process 4

In Operation 340, the superframe order determined through Operation 320 increases until time slots are allocated to all nodes included in the network, and the beacon order determined through Operation 320 is compared with the increased superframe order to adjust at least one of the beacon order and the number of nodes. This operation may be selectively performed.

In more detail, if GTS is not successfully allocated to any node in Process 4, the SO and BO values respectively determined in Process 3 and Process 2 should be corrected. This operation is also repeatedly performed until GTS is allocated to all nodes in the network. First, in order to induce the decrease of MinCFPlength and the increase of MaxCFPlength according to Equation 16 and Equation 17, respectively, it is necessary to increase the SO value. After the SO increases, $Ls_i$ is calculated again according to Equation 14, and Process 4 repeats. The SO should be smaller than BO, and if it is not true, the SO value may not further increase. In this case, the only way for further progression is to decrease the BO value. After the BO decreases, $PBI_i$ of Equation 9 is calculated again, and the operation returns to Process 3. In Process 3, The SO is calculated again for a new value of BO. If suitable values of the SO and BO are not found, the message set $\phi'$ is not scheduled. It is because the given traffic condition of the message set $\phi'$ exceeds the network capacity. In this case, it is necessary to adjust the input $\phi'$ by reducing the number of nodes in the network.

FIG. 7 is a scheduling algorithm which implements an overall process of FIG. 3 with pseudo codes according to an embodiment of the present disclosure, which includes all operations of Process 1 and Process 5 described above. The pseudo codes may be sufficiently understood based on the above description about the scheduling algorithm by those having ordinary skill in the art, and therefore they are not described in detail here.

Hereinafter, corrections of existing IEEE 802.15.4 standards for supporting the scheduling algorithm proposed in the embodiments of the present disclosure will be described.

Figure 8:
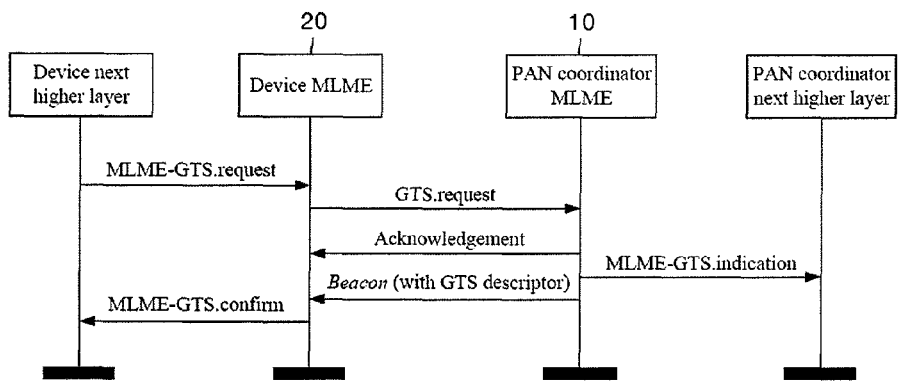
FIG. 8 is a diagram illustrating a method for allocating contention free periods to nodes in a wireless network pursuant to IEEE 802.15.4 standards according to another embodiment of the present disclosure.
Figure 9A:
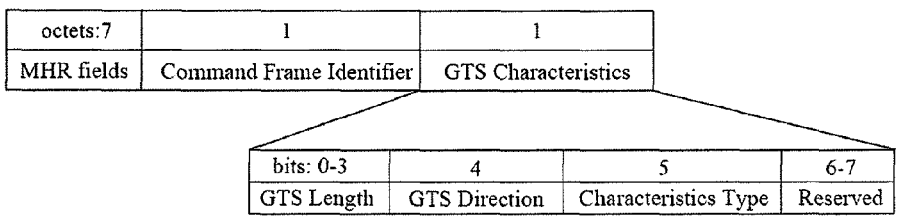
FIGS. 9a and 9b are diagrams comparatively illustrating a conventional standard and a standard adopted by embodiments of the present disclosure, respectively for a frame structure on the GTS.request command.
Figure 9B:
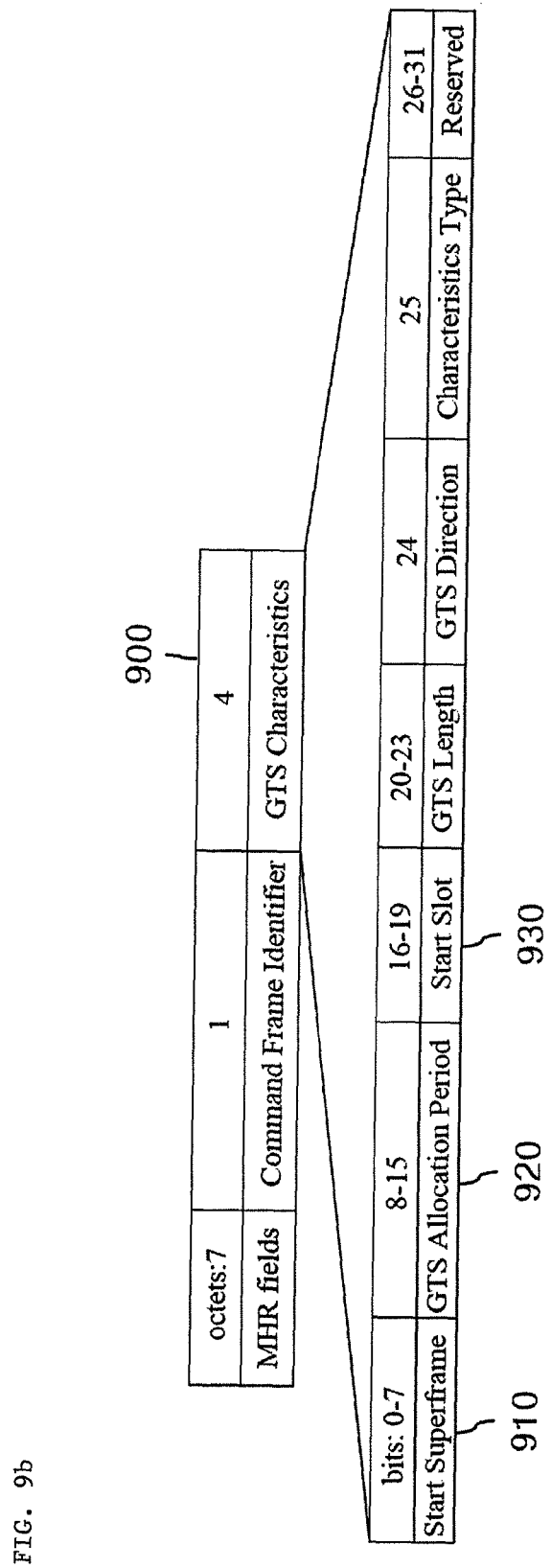
Figure 10A:
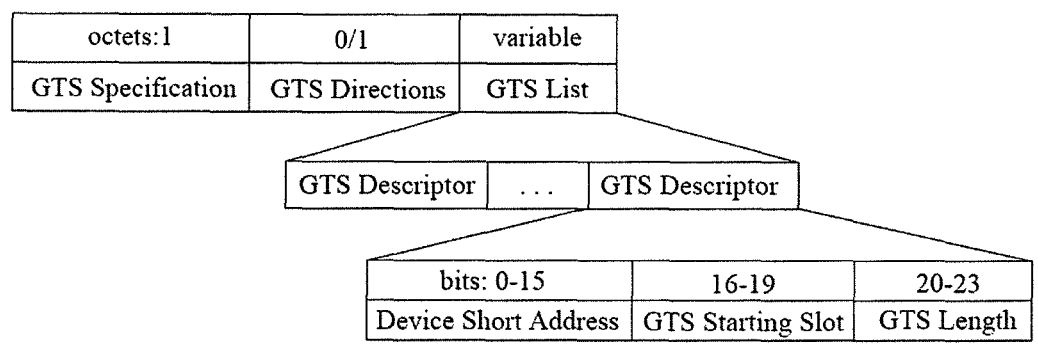
FIGS. 10a and 10b are diagrams comparatively illustrating a conventional standard and a standard adopted by embodiments of the present disclosure, respectively for the frame structure on GTS information of a beacon frame.
Figure 10B:
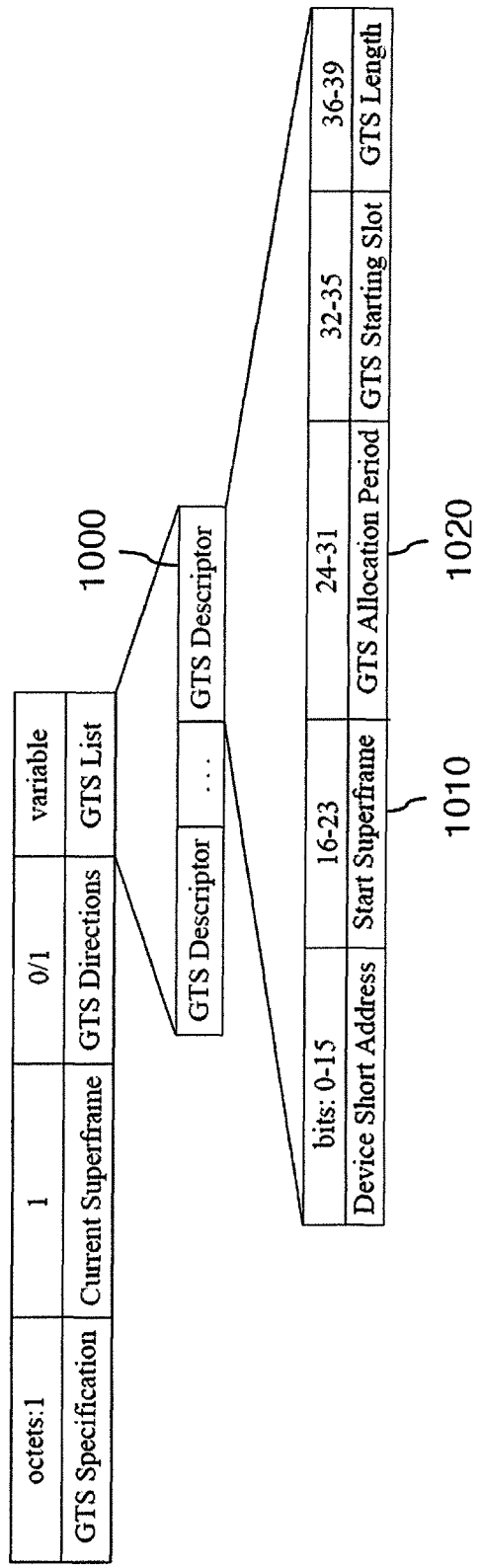

FIG. 8 is a diagram illustrating a method for allocating contention free periods to nodes in a wireless network pursuant according to IEEE 802.15.4 standards according to another embodiment of the present disclosure, where message sequences exchanged between a PAN coordinator 10 and a sensor node (device) 20 are shown in order. Particularly, FIG. 8 shows a message sequence chart for GTS allocation defined in IEEE 802.15.4. In addition, FIGS. 9a and 9b are diagrams comparatively illustrating a conventional standard and a standard adopted by embodiments of the present disclosure, respectively for a frame structure on the GTS.request command. Similarly, FIGS. 10a and 10b are diagrams comparatively illustrating a conventional standard and a standard adopted by embodiments of the present disclosure, respectively for the frame structure on GTS information of a beacon frame.

First, in a case where GTS allocation is demanded by a next higher layer from MAC of the device, an original MLME-GTS.request is called, and GTS.request command is transmitted from the device. FIG. 9a shows a conventional frame structure for the GTS.request command, where MHR field and Command Frame Identifier may be easily understood by those having ordinary skill in the art, and its detailed description may defocus the essence of the present disclosure and therefore is not provided here. The length of the GTS characteristics field is 1 byte. First 4 bits represent the length of GTS which is the number of slots requested. The fifth bit represents the direction of GTS. If the corresponding bit is 0, it represents transmission, and if the corresponding bit is 1, it represents receiving. The sixth bit represents GTS allocation and release. If the corresponding bit is 1, it represents allocation, and if the corresponding bit is 0, it represents release. The last 2 bits are reserved for future use.

After the command is received, the coordinator transmits an acknowledgement message to the device and determines whether there is a sufficient space for the device. This determination should be performed by the coordinators of 4 superframes after the request is received. The allocation result is displayed in the GTS information field of the conventional beacon frame through GTS descriptor as shown in FIG. 10a. GTS List may be composed of a plurality of GTS descriptors. The descriptor remains in the beacon frame for 4 superframes.

In order to apply the scheduling algorithm according to another embodiment of the present disclosure as described above, the GTS allocation method defined by IEEE 802.15.4 standards are corrected as follows.

First, a GTS characteristics field 900 of GTS.request command is corrected. As described above, each node is allocated to a suitable GTS which may be accomplished by specifying a starts superframe ($StartSF_i$), a GTS allocation interval ($PBI_i$), a start slot ($StartSlot_i$) and a GTS length ($Ls_i$). Therefore, as shown in FIG. 9b, 1 byte is added to the start superframe ($StartSF_i$) 910, 1 byte is added to the GTS allocation interval ($PBI_i$) 920, and 4 bits are added to the start slot ($StartSlot_i$) 930 to correct the GTS.request command. Since the traffic is deductively scheduled, the GTS requested by other nodes will not overlap each other as long as the network is suitably set.

In summary, in the method for allocating the contention free period to nodes in a wireless network according to IEEE 802.15.4 standards, if the allocation of a guaranteed time slot is requested from MAC of the device by the next higher layer, the GTS.request command having 4 bytes of the GTS characteristics field 900 is transmitted from the corresponding device to the PAN coordinator as a response to the request. At this time, the GTS characteristics field 900 includes 1 byte representing the start superframe ($StartSlot_i$) 910, 1 byte representing the GTS allocation interval ($PBI_i$) 920 and 4 bits representing the start slot (StartSlot) 930.

Second, the GTS information field of the beacon frame is corrected. Since each device needs to know that the superframe transmits real-time data, it is necessary to further add one field (hereinafter, referred to as a Current Superframe field) to the GTS information field of the beacon frame displayed by the current superframe ($S_j$) as shown in FIG. 10b. Regarding a GTS descriptor 1000 which is one element of GTS List, 1 byte representing a start superframe ($StartSF_i$) 1010 is added, and 1 byte representing a GTS allocation interval ($PBI_i$) 1020 is added. The GTS descriptor of the node i is included in only a beacon of the superframe for the node where GTS is allocated and which appears four times in the beacon frame.

In summary, in the method for allocating the contention free period to nodes in a wireless network according to IEEE 802.15.4 standards, a beacon frame having the GTS descriptor field 1000 is transmitted from the PAN coordinator to the corresponding device as a response to the GTS.request command. At this time, the GTS descriptor field 1000 includes 1 byte representing the start superframe 1010 and 1 byte representing the GTS allocation interval 1020.

Figure 11:
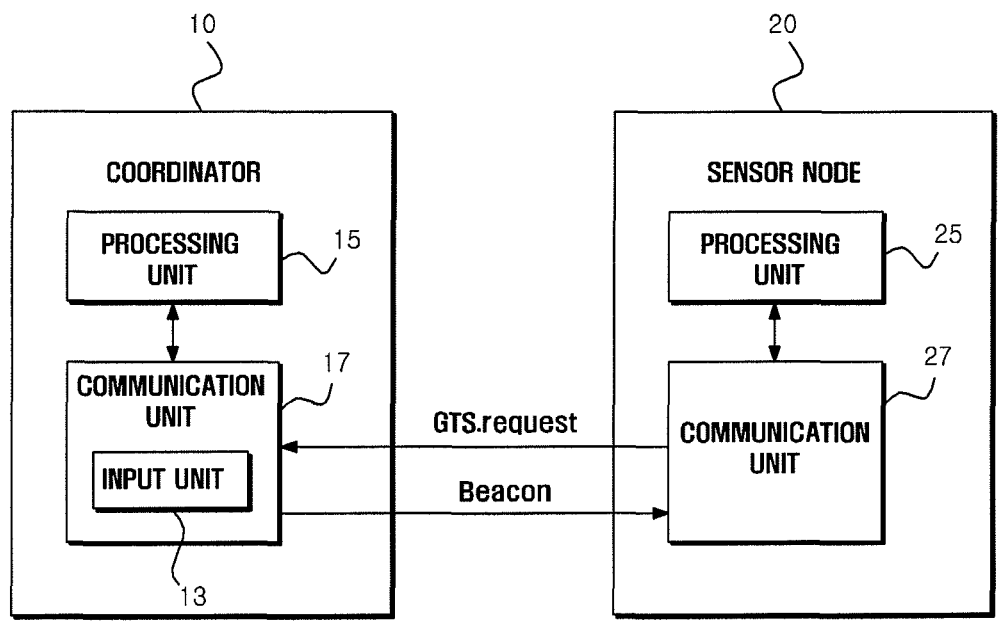
FIG. 11 is a block diagram showing an apparatus for allocating time slots to nodes without contention in a predetermined wireless network including at least one coordinator and a plurality of nodes according to an embodiment of the present disclosure.

FIG. 11 is a block diagram showing an apparatus for allocating time slots to nodes without contention in a predetermined wireless network including at least one coordinator and a plurality of nodes according to an embodiment of the present disclosure. The technical means and detailed operations of the coordinator 10 and the sensor node 20 have been already described through FIG. 3, and therefore they are described just briefly here. In addition, it is obvious that the wireless network means the wireless network by the beacon-enabled mode according to IEEE 802.15.4 standards.

First, the coordinator 10 generally includes an input unit 13, a processing unit 15 and a communication unit 17.

The input unit 13 of the coordinator 10 plays a role of receiving the packet length and the maximum allowable latency of nodes and converting them into data in symbol units. At this time, the input unit 13 is a means capable of receiving electron-type data, and it may be included in the communication unit 17 or implemented as an integrated device as necessary.

The processing unit 15 of the coordinator 10 determines a beacon order so that the beacon interval representing the length of the superframe becomes smaller than or equal to the minimum value of the maximum allowable latency converted through the input unit 13, determines a superframe order so that the sum of the length of the beacon frame, the length of the contention access period, and the length of the contention free period capable of allocating time slots to nodes without contention is smaller than the length of the active portion based on the converted packet length, and respectively allocates guaranteed time slots without contention to nodes according to the allocation priority order for the nodes. In addition, the processing unit 15 may additionally perform a process of adjusting at least one of the beacon order and the number of nodes by increasing the determined superframe order until time slots are allocated to all nodes included in the network and comparing the determined beacon order with the increased superframe order.

The processing unit 15 has at least one processor to perform a series of operations from the input data, and determines and controls control operations according to the operation result. At this time, storage (memory) required for a series of operations may be separately provided.

Meanwhile, the sensor node 20 may generally include a processing unit 25 and a communication unit 27, and more variable hardware and sensors may be provided as necessary. The processing unit 25 of the sensor node 20 may have different roles according to its inherent function but it basically obeys the level of hardware required in the wireless sensor network. In addition, the communication unit 27 may be utilized for transmitting the data collected by the sensor node 20 to the coordinator 10 or communicating with the coordinator 10. Detailed description on the physical configuration of the sensor node 20 may defocus the essence of the present disclosure and therefore it is not provided here.

The industrial wireless communication network demands strict real-time service, scalability and flexibility. A conventional IEEE 802.15.4 protocol supports real-time transmission by means of the guaranteed time slot (GTS). However, problems that important limits are present on scalability and feasibility of the network have been pointed out. The above embodiments of the present disclosure are proposed to overcome such limits, and the various embodiments of the present disclosure propose a new CFP traffic scheduling algorithm based on the window scheduling algorithm. Therefore, according to the above embodiments of the present disclosure, (i) 7 or more periodic nodes may be received simultaneously while ensuring real-time transmission, (ii) the allocation of bandwidth in CFP may be greatly improved, and (iii) the energy efficiency in the network may be improved. These advantages may be obtained by partially correcting the conventional IEEE 802.15.4 protocol as described with reference to FIGS. 8 to 10b.

Meanwhile, the present disclosure may be implemented on a computer-readable recording medium with codes readable by a computer. The computer-readable recording medium includes all kinds of recording devices where data readable by a computer system is stored.

The computer-readable recording medium may be, for example, ROM, RAM, CD-ROM, magnetic tapes, floppy disks, optical data storages, or the like, and it may also include a device implemented in a carrier wave (for example, transmission through Internet) form. In addition, the computer-readable recording medium may be distributed in a computer system connected by a network so that computer-readable codes are stored and executed in a distributed method. In addition, functional program, codes and code segments for implementing the present disclosure may be easily inferred by programmers in the art.

The present disclosure has been described based on various embodiments. A person having ordinary skill in the art will understand that the present disclosure may be modified without departing from the spirit of the present disclosure. Therefore, the disclosed embodiments should be interpreted not in a limiting aspect but in a descriptive aspect. The scope of the present disclosure is not defined by the above description but by the appended claims, and all differences equivalent to the present disclosure should be interpreted to be included in the present disclosure.

What is claimed is:

1. A method for allocating time slots to a plurality of nodes without contention in a predetermined wireless network including the nodes, the method comprising:
   receiving a packet length and maximum allowable latencies of the nodes and converting the packet length and the maximum allowable latencies into data in symbol units;
   determining a beacon order so that a beacon interval representing a length of a superframe is smaller than or equal to a minimum value of the converted maximum allowable latencies;
   determining a superframe order so that the sum of a length of a beacon frame, a length of a contention access period, and a length of contention free period capable of allocating the time slots to nodes without contention is smaller than a length of an active portion, based on the converted packet length; and
   allocating a guaranteed time slot without contention to each node according to an allocation priority order for the nodes;
   wherein said determining of the beacon order includes:
   estimating an initial value of the beacon order so that the beacon interval is smaller than or equal to a minimum value of the converted maximum allowable latencies;
   determining an allocation interval of the guaranteed time slots for the nodes by using a window scheduling algorithm; and
   determining an adjusted final beacon order by decreasing the estimated initial value of the beacon order so that the number of guaranteed time slots in one superframe is 7 or less.

2. The method according to claim 1, further comprising:
   adjusting at least one of the beacon order and the number of nodes by increasing the determined superframe order until the time slots are allocated to all nodes included in the network and comparing the determined beacon order with the increased superframe order.

3. The method according to claim 1, wherein the window scheduling algorithm divides one transmission medium with a limited bandwidth into a plurality of windows so that the transmission medium is shared by the plurality of nodes, and is scheduled so that a generation time of a periodic data in the divided window does not exceed a predetermined threshold value.

4. The method according to claim 1, wherein said determining of the superframe order includes:
   estimating an initial value of the superframe order so that the sum of the length of the beacon frame, the length of the minimum contention access period, and the length of the contention free period is smaller than the length of the active portion, based on the converted packet length;
   calculating a length of the guaranteed time slot for the nodes, a minimum length of the contention free period required for allocating an input value, and a length of the maximum allowable contention free period, based on the converted packet length; and
   determining an adjusted final superframe order by increasing the estimated superframe order so that the minimum length of the calculated contention free period is smaller than or equal to the length of the calculated maximum allowable contention free period.

5. The method according to claim 1, wherein said allocating of the guaranteed time slot includes:
   determining the allocation priority order for the nodes according to the allocation interval of the guaranteed time slots and the length of the guaranteed time slots; and
   allocating the guaranteed time slots to the nodes, respectively, by using the allocation interval of the guaranteed time slots according to the determined allocation priority order.

6. The method according to claim 1, wherein the predetermined wireless network is a wireless network by a beacon-enabled mode according to IEEE 802.15.4 standards.

7. A non-transitory computer-readable recording medium on which a program for executing the method according to claim 1 is recorded.

* * * * *